United States Patent
Winningham

(10) Patent No.: US 6,531,522 B1
(45) Date of Patent: Mar. 11, 2003

(54) FAST CURING PRIMARY OPTICAL FIBER COATING

(75) Inventor: Michael J. Winningham, Big Flats, NY (US)

(73) Assignee: Corning Incorporated, Corning, NY (US)

(*) Notice: Subject to any disclaimer, the term of this patent is extended or adjusted under 35 U.S.C. 154(b) by 154 days.

(21) Appl. No.: 09/712,603

(22) Filed: Nov. 14, 2000

Related U.S. Application Data

(60) Provisional application No. 60/173,828, filed on Dec. 30, 1999.

(51) Int. Cl.[7] ................................................ C08F 2/46
(52) U.S. Cl. .................... 522/96; 522/90; 522/120; 522/121; 522/122; 522/171; 522/173; 522/178; 522/180; 522/182; 427/508; 427/515; 427/517; 427/518; 428/378; 428/380; 428/394; 428/402.22; 428/423.1
(58) Field of Search .................... 522/96, 182, 90, 522/120, 121, 122, 180, 173, 171, 178; 427/508, 515, 517, 518; 428/378, 380, 394, 402.22, 423.1

(56) References Cited

U.S. PATENT DOCUMENTS

| | | |
|---|---|---|
| 4,076,380 A | 2/1978 | DiMarcello et al. |
| 4,176,911 A | 12/1979 | Marcatili et al. |
| 4,300,930 A | 11/1981 | Chang |
| 4,402,570 A | 9/1983 | Chang |
| 4,474,830 A | 10/1984 | Taylor |
| 4,486,212 A | 12/1984 | Berkey |
| 4,581,165 A | 4/1986 | Frank et al. |
| 4,608,409 A | 8/1986 | Coady et al. |
| 4,609,718 A | 9/1986 | Bishop et al. |
| 4,629,287 A | 12/1986 | Bishop |
| 4,690,502 A | 9/1987 | Zimmerman et al. |
| 4,752,112 A | 6/1988 | Mayr |
| 4,798,852 A | 1/1989 | Zimmerman et al. |
| 4,962,992 A | 10/1990 | Chapin et al. |
| 5,104,433 A | 4/1992 | Chapin et al. |
| 5,486,378 A | 1/1996 | Oestreich et al. |
| 5,729,645 A | 3/1998 | Garito et al. |
| 6,191,187 B1 * | 2/2001 | Yamamura et al. ......... 428/378 |
| 6,316,516 B1 * | 11/2001 | Chien et al. ............... 427/515 |

FOREIGN PATENT DOCUMENTS

| | | |
|---|---|---|
| JP | 01299807 | 12/1989 |
| JP | 04321660 | 11/1992 |
| JP | 04356444 | 12/1992 |
| JP | 04356443 | 4/1993 |
| JP | 2000044650 | 2/2000 |
| WO | WO 96/11217 | 4/1996 |
| WO | WO 97/14737 | 4/1997 |
| WO | WO 98/09923 | 3/1998 |
| WO | WO 99/08975 | 2/1999 |

OTHER PUBLICATIONS

U.S. patent application No. 09/301,814, filed Apr. 29, 1999, Chien et al.

Midwinter, *Optical Fibers for Transmission*, New York, John Wiley, pp. 166–178 (1979).

(List continued on next page.)

*Primary Examiner*—James J. Seidleck
*Assistant Examiner*—Sanza L. McClendon
(74) *Attorney, Agent, or Firm*—James V. Suggs; Timothy R. Krogh

(57) ABSTRACT

The present invention relates to a coating for an optical fiber. The coating includes a monomer. The monomer includes an oxyglycidyl (meth)acrylate component. A coating with the monomeric component has exhibited an excellent polymerization rate. The present invention also relates to methods of making such optical fibers coated in accordance with the invention and the coated glass article.

30 Claims, 1 Drawing Sheet

OTHER PUBLICATIONS

Blankenship et al., "The Outside Vapor Deposition Method of Fabricating Optical Waveguide Fibers", *IEEE J. Quantum Electron.* 18:1418–1423 (1982).

Inada, "Recent Progress in Fiber Fabrication Techniques by Vapor–phase Axial Deposition", *IEEE J. Quantum Electron.* 18:1421–1431 (1982.

Nagel et al., "An Overview of the Modified Chemical Vapor Deposition (MCVD) Process and Performance," *IEEE J. Quantum Electron.* 18:459–476 (1982).

*Handbook of Pressure Sensitive Adhesive Technology*, $3^{rd}$ Edition, pp.36, 37, 57–61, 169, 173, 174 (1999).

* cited by examiner

FAST CURING PRIMARY OPTICAL FIBER COATING

CROSS-REFERENCE TO RELATED APPLICATIONS

This application claims the benefit of U.S. Provisional Patent Application Ser. No. 60/173,828 on Dec. 30, 1999, the content of which is relied upon and incorporated herein by reference in its entirety, and the benefit of priority under 35 U.S.C. §120 is hereby claimed.

BACKGROUND OF THE INVENTION

1. Field of the Invention

The present invention relates generally to optical fibers and particularly to coatings applied to the fibers.

2. Technical Background

Optical fibers have acquired an increasingly important role in the field of communications, frequently replacing existing copper wires. This trend has had a significant impact in the local area networks (i.e., for fiber-to-home uses), which has seen a vast increase in the usage of optical fibers. Further increases in the use of optical fibers in local loop telephone and cable TV service are expected, as local fiber networks are established to deliver ever greater volumes of information in the form of data, audio, and video signals to residential and commercial users. In addition, use of optical fibers in home and commercial business for internal data, voice, and video communications has begun and is expected to increase.

The fibers used in local networks are directly exposed to harsh conditions, including severe temperature and humidity extremes. Prior coatings for optical fibers did not perform well under such adverse conditions, the need existed for the development of higher performance coatings to address the wide and varied temperature and humidity conditions in which fibers are employed. Specifically, these coatings possessed thermal, oxidative, and hydrolytic stability which is sufficient to protect the encapsulated fiber over a long life-span (i.e., about twenty-five or more years).

Optical fibers typically contain a glass core, a cladding, and at least two coatings, i.e., a primary (or inner) coating and a secondary (or outer) coating. The primary coating is applied directly to the cladding and, when cured, forms a soft, elastic, and compliant material which encapsulates the glass fiber. The primary coating serves as a buffer to cushion and protect the glass fiber core when the fiber is bent, cabled, or spooled. Stresses placed upon the optical fiber during handling may induce microbending of the fibers and cause attenuation of the light which is intended to pass through them, resulting in inefficient signal transmission. The secondary coating is applied over the primary coating and functions as a tough, protective outer layer that prevents damage to the glass fiber during processing and use.

Certain characteristics are desirable for the primary coating, and others for the secondary coating. The modulus of the primary coating must be sufficiently low to cushion and protect the fiber by readily relieving stresses on the fiber, which can induce microbending and consequent inefficient signal transmission. This cushioning effect must be maintained throughout the fiber's lifetime.

Because of differential thermal expansion properties between the primary and secondary coatings, the primary coating must also have a glass transition temperature ($T_g$) which is lower than the foreseeable lowest use temperature. This enables the primary coating to remain elastic throughout the temperature range of use, facilitating differences in the coefficient of thermal expansion between the glass fiber and the secondary coating.

It is important for the primary coating to have a refractive index which is different (i.e., higher) than the refractive index of the cladding. This permits a refractive index differential between the cladding and the primary coating that allows errant light signals to be refracted away from the glass core.

The cost to produce coated optical fibers, with the above properties, is largely dependent on the draw tower line speed and draw utilization. A limiting factor in the operation of a draw tower line speed is the rate of cure of the primary and secondary coatings applied to the fibers. Under cured coatings can yield unwanted fiber defects, which may lead to functional problems with the resultant coated fiber. Previous methods to improve the rate of cure or rate of polymerization include the use of wholly acrylated coating systems, the use of highly efficient photoinitiating systems, and increases in UV radiation. Photoinitiated polymerization reactions generally follow the relationship:

$$R_p = k_p [M](\Phi \epsilon I_o [A] b/k_t)^{1/2}$$

$R_p$: rate of polymerization; $k_p$: propagation rate constant; [M]: concentration of reactive functional group; $\Phi$: quantum yield for initiation; $\epsilon$: molar absorptivity; $I_o$: incident light intensity; [A]: concentration of photoinitiator; b: thickness of reaction system (coating thickness); and $k_t$: termination rate constant.

Formulation efforts to maximize the rate of polymerization include the use of reactive monomers, oligomers, and mixtures thereof with high propagation rate constants, the use photoinitiators with high photoinitiating efficiencies, and selecting components that would not increase the tendency toward chain termination or chain transfer. Chain transfer agents may not decrease the rate of polymerization, but will reduce the degree of polymerization.

SUMMARY OF THE INVENTION

One aspect of the invention relates to an optical fiber which includes a glass fiber and a primary coating encapsulating and in contact with the glass fiber. This primary coating is the cured product of a polymerizable composition that includes a monomeric component with an oxyglycidyl (meth)acrylate.

Another aspect of the invention relates to a method of making an optical fiber in accordance with the present invention. This method involves providing a glass fiber, coating the glass fiber with a primary polymerizable composition that includes a monomeric component with an oxyglycidyl (meth)acrylate. The coating composition is polymerized under conditions effective to form a primary coating over the glass fiber.

The coating composition of the invention has the advantage of having an excellent polymerization rate. Coating an optical fiber with the coating of the invention has the advantage of increasing the draw speed and increasing the rate of production of the resultant optical fiber.

Additional features and advantages of the invention will be set forth in the detailed description which follows, and in part will be readily apparent to those skilled in the art from that description or recognized by practicing the invention as described herein, including the detailed description which follows, the claims, as well as the appended drawing.

It is to be understood that both the foregoing general description and the following detailed description are merely exemplary of the invention, and are intended to provide an overview or framework for understanding the nature and character of the invention as it is claimed. The accompanying drawing is included to provide a further understanding of the invention, and is incorporated in and constitutes a part of this specification. The drawing illustrates an embodiment of the invention, and together with the description serve to explain the principles and operation of the invention.

DETAILED DESCRIPTION OF THE PREFERRED EMBODIMENTS

Figure 1:
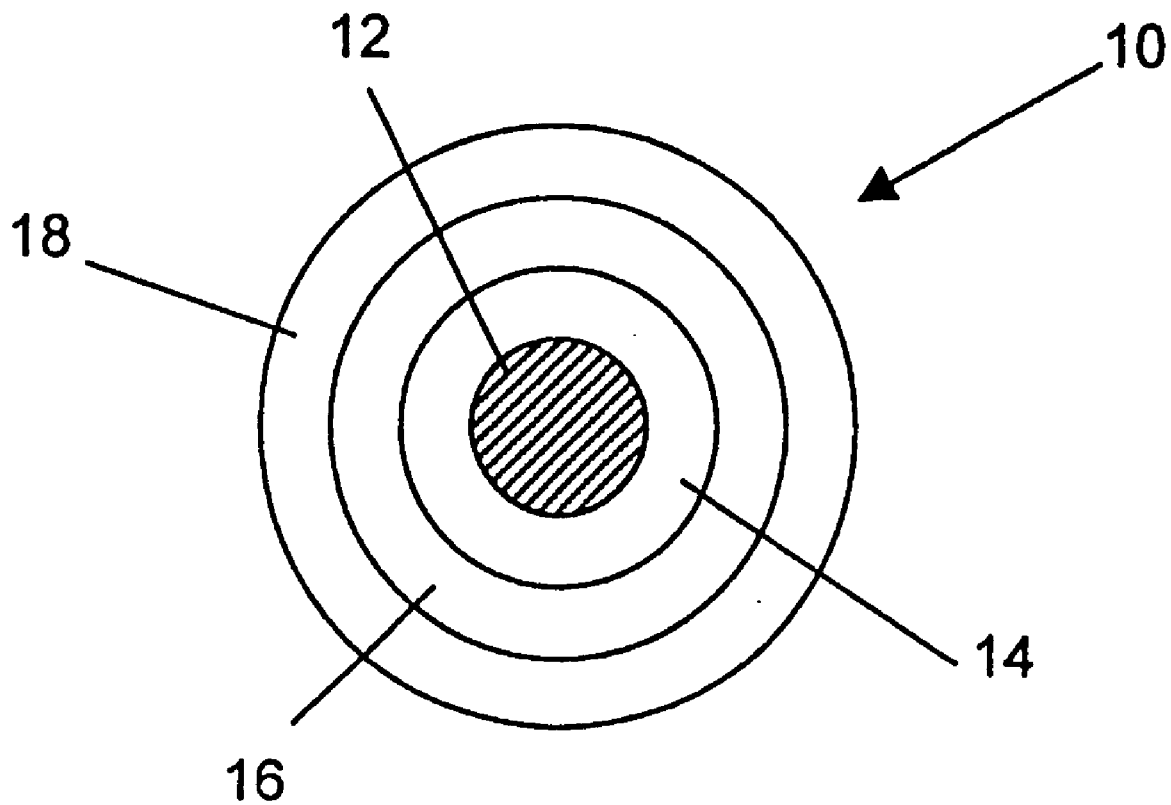
FIG. 1 is a cross-sectional view of an optical fiber made in accordance with the present invention.

Reference will now be made in detail to the present preferred embodiments of the invention, an example of which is illustrated in the accompanying drawing. Wherever possible, the same reference numbers will be used throughout the drawing to refer to the same or like parts. An exemplary embodiment of the present invention is shown in FIG. 1, and is designated generally throughout by reference numeral 10.

The invention relates to an optical fiber which includes a glass fiber and a primary coating encapsulating and in contact with the glass fiber. This primary coating is the cured or substantially cured product of a polymerizable composition that includes a monomer with an oxyglycidyl (meth) acrylate component and is present in an amount effective to enhance the rate of cure of the primary coating (a.k.a. polymerization rate or cure speed). Recently it has been discovered that including an oxyglycidyl (meth)acrylate component in the monomer will increase the polymerization rate of the coating. Referring to FIG. 1, the optical fiber 10 includes a glass core 12, a cladding layer 14 surrounding and adjacent to the glass core 12, a primary coating material 16 which adheres to the cladding layer 14, and one or more secondary (or outer) coating materials 18 surrounding and adjacent to the primary coating material 16.

The primary material 16 includes a monomer. In accordance with the invention, the monomer includes an oxyglycidyl (meth)acrylate component. Preferably the monomeric component has the structure

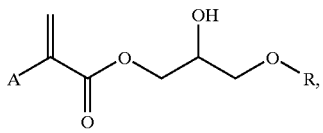

wherein R is an organic moiety and A is H or CH₃. R may be any organic moiety such as aromatic hydrocarbons, aliphatic hydrocarbons, heteroatoms, or cyclo hydrocarbons. Examples of suitable heteroatoms consist of nitrogen, oxygen, halogens, silicon, sulfur, phosphorus, and mixtures thereof. The aromatic hydrocarbons, aliphatic hydrocarbons and cyclo hydrocarbons may also contain heteroatoms. It is more preferred that the R group is an aliphatic 10–13 carbon hydrocarbon. It is most preferred that the monomeric component is a lauryloxyglycidyl (meth)acrylate or a phenoxyglycidyl (meth)acrylate. Lauryloxyglycidyl (meth)acrylate has the general formula (I) listed below:

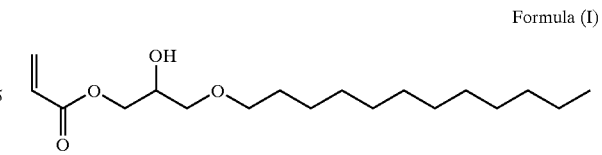

Formula (I)

Preferably, the monomeric component is present in the composition in an amount of about 5 to about 95 percent by weight, more preferably about 5 to about 60 percent by weight, most preferably, about 20 to about 50 percent by weight.

As used herein, the weight percent of a particular component refers to the amount introduced into the bulk composition excluding an adhesion promoter and other additives. The amount of adhesion promoter and various other additives that are introduced into the bulk composition to produce a composition of the present invention is listed in parts per hundred. For example, a monomer with an oxyglycidyl acrylate, an oligomer, and photoinitiator are combined to form the bulk composition such that the total weight percent of these components equals 100 percent. To this bulk composition, an amount of adhesion promoter, for example 1.0 part per hundred, is introduced in excess of the 100 weight percent of the bulk composition.

Typically, a major component of the coating composition of the present invention is an oligomer. Preferably the oligomer is an ethylenically unsaturated urethane or urea oligomer, more preferably the oligomeric component of the coating is an aliphatic polyether urethane acrylate.

Urethane oligomers are conventionally provided by reacting an aliphatic or aromatic diisocyanate with a dihydric polyether or polyester, most typically a polyoxyalkylene glycol such as a polyethylene glycol. Such oligomers typically have 4–10 urethane groups and may be of high molecular weight, e.g., 2000–8000. However, lower molecular weight oligomers, having molecular weights in the 500–2000 range, may also be used. U.S. Pat. No. 4,608,409 to Coady et al. and U.S. Pat. No. 4,609,718 to Bishop et al., which are hereby incorporated by reference, describe such syntheses in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from 2–250 carbon atoms and, preferably, are substantially free of ether or ester groups. The ranges of oligomer viscosity and molecular weight obtainable in these systems are similar to those obtainable in unsaturated, polar oligomer systems, such that the viscosity and coating characteristics thereof can be kept substantially unchanged. The reduced oxygen content of these coatings has been found not to unacceptably degrade the adherence characteristics of the coatings to the surfaces of the glass fibers being coated.

As is well known, polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently non-polar and saturated as to avoid compromising the moisture resistance of the system.

Thus, it is desirable for the coating composition of the present invention to contain at least one ethylenically unsaturated oligomer, although more than one oligomer component can be introduced into the composition. Preferably, the oligomer(s) is present in the coating composition in an amount between about 10 to about 90 percent by weight, more preferably between about 30 to about 90 percent by weight, and most preferably between about 35 to about 60 percent by weight.

Examples of suitable ethylenically unsaturated oligomers are polyether urethane acrylate oligomers (e.g., CN986 available from Sartomer Company, Inc., (West Chester, Pa.), BR3731 and STC3-149 available from Bomar Specialties Co. (Winsted, Conn.), and Purelast566A available from Polymer Systems Corporation, (Orlando, Fla.)), polyester urethane acrylate oligomers (e.g., CN966 and CN973 available from Sartomer Company, Inc. and BR7432 available from Bomar Specialty Co.), polyurea urethane acrylate oligomers (e.g., oligomers disclosed in U.S. Pat. Nos. 4,690,502 and 4,798,852 to Zimmerman et al., U.S. Pat. No. 4,609,718 to Bishop, and U.S. Pat. No. 4,629,287 to Bishop et al., which are hereby incorporated by reference), polyether acrylate oligomers (e.g., Genomer 3456 available from Rahn AG (Zurich, Switzerland), polyester acrylate oligomers (e.g., Ebecryl 80, 584, and 657 available from UCB Radcure (Atlanta, Ga.)), polyurea acrylate oligomers (e.g., oligomers disclosed in U.S. Pat. Nos. 4,690,502 and 4,798,852 to Zimmerman et al., U.S. Pat. No. 4,609,718 to Bishop, and U.S. Pat. No. 4,629,287 to Bishop et al., all of which are hereby incorporated by reference), epoxy acrylate oligomers (e.g., CN120 available from Sartomer Company, Inc., and Ebecryl 3201 and 3204 available from UCB Radcure), hydrogenated polybutadiene oligomers (e.g., Echo Resin MBNX available from Echo Resins and Laboratory (Versailles, Mo.)), and combinations thereof.

The primary coating compositions of the invention may also optionally include, in addition to the monomeric component with an oxyglycidyl (meth)acrylate and the oligomer component, a co-monomer component. Preferably, the co-monomer is an ethylenically unsaturated monomer, more preferably a (meth)acrylate monomer. Generally, suitable monomers are those for which the resulting homopolymer or mixtures of monomers would have a glass transition temperature ($T_g$) of at most about 20° C., preferably at most about 10° C. Generally, a lower molecular weight (i.e., about 120 to 600) liquid (meth)acrylate-functional monomer is added to the formulation to provide the liquidity needed to apply the coating composition with conventional liquid coating equipment. Typical acrylate-functional liquids in these systems include monofunctional and polyfunctional acrylates (i.e., monomers having two or more acrylate functional groups). Illustrative of these polyfunctional acrylates are the difunctional acrylates, which have two functional groups; the trifunctional acrylates, which have three functional groups; and the tetrafunctional acrylates, which have four functional groups. Monofunctional and polyfunctional methacrylates may also be employed.

When it is desirable to utilize moisture-resistant components, the co-monomer component will be selected on the basis of its compatibility with the selected moisture-resistant oligomer. Not all such liquid monomers may be successfully blended and co-polymerized with the moisture-resistant oligomers, because such oligomers are highly non-polar. For satisfactory coating compatibility and moisture resistance, it is desirable to use a liquid acrylate monomer component comprising a predominantly saturated aliphatic mono- or di-acrylate monomer or alkoxy acrylate monomers.

Thus, it is desirable for the composition to contain at least one ethylenically unsaturated co-monomer, although more than one co-monomer can be introduced into the composition. Preferably, the ethylenically unsaturated co-monomer is present in the composition in an amount up to about 30 percent by weight. In this embodiment of the invention, the coating includes at least about 5 weight percent of the oxyglycidyl (meth)acrylate monomeric component, more preferably about 10 to about 50 weight percent of the monomeric component.

Suitable ethylenically unsaturated co-monomers include lauryl acrylate (e.g., SR335 available from Sartomer Company, Inc., Ageflex FA12 available from CPS Chemical Co. (Old Bridge, N.J.), and Photomer 4812 available from Henkel (Ambler, Pa.)), ethoxylatednonylphenol acrylate (e.g., SR504 available from Sartomer Company, Inc. and Photomer 4003 available from Henkel), phenoxyethyl acrylate (e.g., SR339 available from Sartomer Company, Inc., Ageflex PEA available from CPS Chemical Co., and Photomer 4035 available from Henkel), isooctyl acrylate (e.g., SR440 available from Sartomer Company, Inc. and Ageflex FA8 available from CPS Chemical Co.), tridecyl acrylate (e.g., SR489 available from Sartomer Company, Inc.), isobornyl acrylate (e.g., SR506 available from Sartomer Company, Inc. and Ageflex IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and Ageflex FA10 available from CPS Chemical Co.), 2-(2-ethoxyethoxy)ethyl acrylate (e.g., SR256 available from Sartomer Company, Inc.), and combinations thereof.

As is well known, optical fiber coating compositions may also contain a polymerization initiator which is suitable to cause polymerization (i.e., curing) of the composition after its application to a glass fiber. Polymerization initiators suitable for use in the primary coating compositions of the present invention include thermal initiators, chemical initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes between about 0.5 to about 10.0 percent by weight, more preferably between about 1.5 to about 7.5 percent by weight.

The photoinitiator, when used in a small but effective amount to promote radiation cure, must provide reasonable cure speed without causing premature gelation of the coating composition. A desirable cure speed is any speed sufficient to cause substantial curing of the coating materials. As measured in a dose versus modulus curve, a cure speed for coating thicknesses of about 25–35 $\mu$m is, e.g., less than 1.0 J/cm$^2$, preferably less than 0.5 J/cm$^2$.

Suitable photoinitiators include bis acyl phosphine oxide in a blend or a pure form (e.g. Irgacure 1850 or Irgacure 819 available from Ciba Specialty Chemical, Hawthorne, N.Y.), 1-hydroxycyclohexylphenyl ketone (e.g., Irgacure 184 available from Ciba Specialty Chemical (Hawthorne, N.Y.), (2,6-dimethoxybenzoyl)-2,4,4-trimethylpentyl phosphine oxide (e.g., commercial blends Irgacure 1800 and 1700 available from Ciba Specialty Chemical), 2,2-dimethoxyl-2-phenyl acetophenone (e.g., Irgacure 651, available from Ciba Specialty Chemical), and combinations thereof.

Preferably, an adhesion promoter is present in the coating composition. In a preferred embodiment, the adhesion promoter is present in the composition in an amount between about 0.1 to about 10 parts per hundred, more preferably between about 0.25 to about 4 parts per hundred, most preferably between about 0.5 to about 3 parts per hundred. Examples of a suitable adhesion promoter include organofunctional silane, titanate, zirconate, and mixtures thereof. A preferred adhesion promoter is a bis silane. Suitable alternative adhesion promoters include 3-mercaptopropyltrimethoxysilane (3-MPTMS, available from United Chemical Technologies (Bristol, Pa.)), bis (trimethoxysilylethyl)benzene (available from Gelest (Tullytown, Pa.)); see U.S. patent application Ser. No. 09/301,814, filed Apr. 29, 1999, which is hereby incorporated by reference in its entirety).

A carrier additive may also be used with the adhesion promoter. The carrier is preferably a carrier which functions as a carrier surfactant, ambiphilic reactive or non-reactive surfactant. Reactive surfactants which are partially soluble or insoluble in the composition are particularly preferred. Without being bound to a particular theory, it is believed that carriers which function as reactive surfactants interact with the compound containing a reactive silane by depositing such compounds on the glass fiber, where it is allowed to react. It is desirable for the carrier to be present in an amount between about 0.01 to about 5 parts per hundred, more preferably about 0.25 to about 3 parts per hundred.

Suitable carriers, more specifically carriers which function as reactive surfactants, include polyalkoxypolysiloxanes. A preferred carrier is available from Goldschmidt Chemical Co. (Hopewell, Va.) under the tradename Tegorad 2200 or Tegorad 2700 (acrylated siloxane).

Other classes of suitable carriers are polyols and non-reactive surfactants. Examples of suitable polyols and non-reactive surfactants include polyol Aclaim 3201 (poly (ethylene oxide-co-propylene oxide)) available from Lyondell (formerly known as Arco Chemicals), Newtown Square, Pa. and non-reactive surfactant Tegoglide 435 (polyalkoxy-polysiloxane) available from Goldschmidt Chemical Co. The polyol or non-reactive surfactant may be present in a preferred amount between about 0.01 pph to about 10 pph.

Suitable carriers may also be ambiphilic molecules. An ambiphilic molecule is a molecule that has both hydrophilic and hydrophobic segments. The hydrophobic segment may alternatively be described as a lipophilic (fat/oil loving) segment. A common example of an ambiphilic molecule is soap. A tackifier modifies the time-sensitive rheological property of a polymer product. In general, a tackifier will make a polymer product act stiffer at higher strain rates or shear rates and will make the polymer product softer at low strain rates or shear rates. A tackifier is commonly used in the adhesives industry and enhances the ability of a coating to create a bond with an object that the coating is applied upon. For additional background regarding tackifiers, the *Handbook of Pressure Sensitive Adhesive Technology*, 3$^{rd}$ Edition, is incorporated herein by reference, see pages 36, 37, 57–61, 169, 173, and 174.

One particular suitable tackifier is Uni-tac® R-40 (hereinafter "R-40") available from International Paper Co., Purchase, N.Y. R-40 is a tall oil rosin and is from the chemical family of abietic esters. R-40 contains a polyether segment. Preferably, the tackifier is present in the composition in an amount between about 0.01 to about 10 parts per hundred, more preferred in the amount between about 0.05 to about 10 parts per hundred.

Preferably the adhesion promoter used in combination with the tackifier carrier is a poly(alkoxy)silane. However, the invention is not limited to only a poly(alkoxy)silane adhesion promoter in combination with a tackifier carrier. A preferred poly(alkoxy)silane adhesion promoter is bis (trimethoxysilylethyl)benzene. It is also preferred that the poly(alkoxy)silane adhesion promoter is present in the composition in an amount between 0.1 to 10 pph.

In addition to the above-described components, the primary coating composition of the present invention can optionally include any number of additives, such as reactive diluents, antioxidants, catalysts, and other stabilizers and property-enhancing additives. Some additives can operate to control the polymerization process, thereby affecting the physical properties (e.g., modulus, glass transition temperature) of the polymerization product formed from the primary coating composition. Others can affect the integrity of the polymerization product of the primary coating composition (e.g., protect against de-polymerization or oxidative degradation).

A preferred catalyst is a tin-catalyst, which is used to catalyze the formation of urethane bonds in some oligomer components. Whether the catalyst remains as an additive of the oligomer component or additional quantities of the catalyst are introduced into the composition of the present invention, the presence of the catalyst can act to stabilize the oligomer component in the composition.

A preferred antioxidant is bis hindered phenolic sulfide or thiodiethylene bis(3,5-di-tert-butyl)-4-hydroxyhydrocinnamate (e.g., Irganox 1035, available from Ciba Specialty Chemical).

Referring to FIG. 1, the optical fiber 10 includes a glass core 12, a cladding layer 14 surrounding and adjacent to the glass core 12, a primary coating material 16 which adheres to the cladding layer 14, and one or more secondary (or outer) coating materials 18 surrounding and adjacent to the primary coating material 16. Any conventional material can be used to form the glass core 12, such as those described in U.S. Pat. No. 4,486,212 to Berkey, which is hereby incorporated by reference. The core is typically a silica glass having a cylindrical cross section and a diameter ranging from about 5 to about 10 μm for single-mode fibers and about 20 to about 100 μm for multi-mode fibers. The core can optionally contain varying amounts of other material such as, e.g., oxides of titanium, thallium, germanium, and boron, which modify the core's refractive index. Other dopants which are known in the art can also be added to the glass core to modify its properties.

The cladding layer 14 preferably has a refractive index which is less than the refractive index of the core. A variety of cladding materials, both plastic and glass (e.g., silicate and borosilicate glasses) are used in constructing conventional glass fibers. Any conventional cladding materials known in the art can be used to form the cladding layer 14 in the optical fiber of the present invention.

The cladding layer 14 preferably has a refractive index which is less than the refractive index of the core. A variety of cladding materials, both plastic and glass (e.g., silicate and borosilicate glasses) are used in constructing conventional glass fibers. Any conventional cladding materials known in the art can be used to form the cladding layer 14 in the optical fiber of the present invention.

The glass core 12 and cladding layer 14, which together form the glass fiber, can be formed according to a number of processes known in the art. In many applications, the glass core 12 and cladding layer 14 have a discernable core-cladding boundary. Alternatively, the core and cladding layer can lack a distinct boundary. One such glass fiber is a step-index fiber, which is formed basically by applying the cladding layer 14 as a series of glass or plastic layers of varying refractive index. Exemplary step-index fibers are described in U.S. Pat. Nos. 4,300,930 and 4,402,570 to Chang, which are hereby incorporated by reference. Another such fiber is a graded-index fiber, which has a core whose refractive index varies with distance from the fiber. A graded-index fiber is formed basically by diffusing the glass core 12 and cladding layer 14 into one another. Exemplary graded-index fibers are described in U.S. Pat. No. 5,729,645 to Garito et al., U.S. Pat. No. 4,439,008 to Joormann et al., U.S. Pat. No. 4,176,911 to Marcatili et al., and U.S. Pat. No. 4,076,380 to DiMarcello et al., which are hereby incorporated by reference. The optical fibers of the present invention can contain these or any other conventional core-cladding layer configuration now known or hereafter developed.

The secondary coating material(s) 18 is typically the polymerization (i.e., cured) product of a coating composition that contains urethane acrylate liquids whose molecules become cross-linked when polymerized. Other suitable materials for use in secondary coating materials, as well as considerations related to selection of these materials, are well known in the art and are described in U.S. Pat. Nos. 4,962,992 and 5,104,433 to Chapin, which are hereby incorporated by reference. Various additives that enhance one or more properties of the coating can also be present, including the above-mentioned additives incorporated in the compositions of the present invention.

The secondary coating materials 18 can be a tight buffer coating or, alternatively, a loose tube coating. Irrespective of the type of secondary coating employed, it is preferred that the outer surface of the secondary coating material 18 not be tacky so that adjacent convolutions of the optic fiber (i.e., on a process spool) can be unwound.

The components of the optical fiber of the present invention can optionally include a coloring material, such as a pigment or dye, or an additional colored ink coating.

The optical fibers of the present invention can also be formed into a optical fiber ribbon which contains a plurality of substantially aligned, substantially coplanar optic fibers encapsulated by a matrix material. The matrix material can be made of a single layer or of a composite construction. Suitable matrix materials include polyvinyl chloride as well as those materials known to be useful as secondary coating materials. Preferably the matrix material is the polymerization product of the composition used to form the secondary coating material.

Another aspect of the present invention relates to a method of making an optical fiber of the present invention. Basically, this method can be effected by standard methods with the use of a primary coating composition of the present invention.

Briefly, the process involves providing the glass fiber (core 12 and cladding layer 14), coating the glass fiber with the primary coating composition of the present invention, and polymerizing the composition to form the primary coating material 16. Optionally, a secondary coating composition can be applied to the coated fiber either before or after polymerizing the primary coating. When applied after polymerizing the primary coating, a second polymerization step must be employed.

The core and cladding layer are typically produced in a single operation by methods which are well known in the art. Suitable methods include: the double crucible method as described, for example, in Midwinter, *Optical Fibers for Transmission,* New York, John Wiley, pp. 166–178 (1979), which is hereby incorporated by reference; rod-in-tube procedures; and doped deposited silica processes, also commonly referred to as chemical vapor deposition ("CVD") or vapor phase oxidation. A variety of CVD processes are known and are suitable for producing the core and cladding layer used in the optical fibers of the present invention. They include external CVD processes (Blankenship et al., "The Outside Vapor Deposition Method of Fabricating Optical Waveguide Fibers," *IEEE J. Quantum Electron.,* 18:1418–1423 (1982), which is hereby incorporated by reference), axial vapor deposition processes (Inada, "Recent Progress in Fiber Fabrication Techniques by Vapor-phase Axial Deposition," *IEEE J. Quantum Electron.* 18:1424–1431 (1982), which is hereby incorporated by reference), and modified CVD or inside vapor deposition (Nagel et al., "An Overview of the Modified Chemical Vapor Deposition (MCVD) Process and Performance," *IEEE J. Quantum Electron.* 18:459–476 (1982), which is hereby incorporated by reference).

The primary and optional secondary coating compositions are coated on a glass fiber using conventional processes.

It is well known to draw glass fibers from a specially prepared, cylindrical preform which has been locally and symmetrically heated to a temperature, e.g., of about 2000° C. As the preform is heated, such as by feeding the preform into and through a furnace, a glass fiber is drawn from the molten material. The primary and optional secondary coating compositions are applied to the glass fiber after it has been drawn from the preform, preferably immediately after cooling. The coating compositions are then cured to produce the coated optical fiber. The method of curing can be thermal, chemical, or radiation induced, such as by exposing the un-cured coating composition on the glass fiber to ultraviolet light or electron beam, depending upon the nature of the coating composition(s) and polymerization initiator being employed. It is frequently advantageous to apply both the primary coating composition and any secondary coating compositions in sequence following the draw process. One method of applying dual layers of coating compositions to a moving glass fiber is disclosed in U.S. Pat. No. 4,474,830 to Taylor, which is hereby incorporated by reference. Another method for applying dual layers of coating compositions onto a glass fiber is disclosed in U.S. Pat. No. 4,581,165 to Rannell et al., which is hereby incorporated by reference. Of course, the primary coating composition can be applied and cured to form the primary coating material 16, then the secondary coating composition(s) can be applied and cured to form the secondary coating material 18.

Coated optical fibers 10 of the present invention can also be used to prepare an optical fiber ribbon using conventional methods of preparation. For example, a plurality of coated optical fibers 10 are substantially aligned in a substantially coplanar relationship to one another and, while remaining in this relationship, the coated optical fibers are coated with a composition that is later cured to form the ribbon matrix material. The composition used to prepare the ribbon matrix material can be the same as the secondary coating composition, or any other suitable composition known in the art. Methods of preparing optical fiber ribbons are described in U.S. Pat. No. 4,752,112 to Mayr and U.S. Pat. No. 5,486,378 to Oestreich et al., which are hereby incorporated by reference.

EXAMPLES

The invention will be further clarified by the following example which is intended to be exemplary of the invention.

Example 1

Preparation of Coated Fibers
Materials
Coating of the Invention (Coating A)
All materials were used as received. The monomer used was supplied by Sartomer Company (West Chester, Pa.).

The monomer was an aliphatic oxyglycidyl (meth)acrylate, Sartomer CN 130. The oligomer used was Bomar KWS 1143 and was supplied by Bomar Specialties Company (Winsted, Conn.). The photoinitiator (Irgacure 1850) and antioxidant (Irganox 1035) were supplied by Ciba Specialty Chemicals (Hawthorne, N.Y.). The adhesion promoter, bis (trimethoxysilylethyl) benzene was supplied by Gelest (Tullytown, Pa.).

Control (Coating B)

The oligomer used was supplied by Bomar Specialties Company (Winsted, Conn.). The oligomer used was a urethane acrylate, Bomar BR3731. The monomer used was supplied by Sartomer Company (West Chester, Pa.). The monomer was an ethoxylatednonylphenol acrylate, Sartomer SR504. The photoinitiator used was supplied by Ciba Specialty Chemicals (Hawthorne, N.Y.). The photoinitiator was a BAPO photoinitiator blend, Irgacure 1850. The antioxidant was supplied by Ciba Specialty Chemicals (Hawthorne, N.Y.). The antioxidant was thiodiethylene bis (3,5-di-tert-butyl-4-hydroxyhydrocinnamate), Irganox 1035. The adhesion promoter was supplied by United Chemical Technologies (Bristol, Pa.). The adhesion promoter was 3-mercaptopropyltrimethoxy silane.

General Formulation Procedure

Coating formulations were prepared in 5 gallon metal pails, which were coated with a chemical resistant epoxy resin by the manufacturer. Oligomer(s) was combined with the monomer, and the mixture was warmed with a heating band and stirred with an overhead stirrer. Aluminum foil was used to shield the coating from light. The mixture was stirred at 60° C. for 1–2 hours. Photoinitiator (Irgacure 1850, 3 wt %) and antioxidant (Irganox 1035, 1 pph) solids were then added and the mixtures were allowed to stir another 1–2 hours. After the homogeneous mixture cooled to room temperature, silane adhesion promoter (1 pph) was added and the mixture was stirred at room temperature for an additional 1–2 hours.

Fiber Draw Runs

Once the coating formulations were prepared, the primary and secondary coating materials were applied to drawn glass fibers subsequent to cooling. The glass fiber, having a diameter of about 125 □m, was introduced into a container of one of the compositions listed in Tables 1 and 2. As the coated fiber was removed from the container, the thickness of the primary coating composition was adjusted to about 32.5 □m by passing the coated fiber through a die. The coated fiber was drawn through a second coating container holding a secondary coating composition as listed in Table 3. As the coated fiber was removed from the second chamber, the thickness of the secondary coating composition was adjusted to about 27.5 µm by passing the coated fiber through a die.

The coated fiber was then cured with actinic radiation, preferably actinic radiation is ultraviolet light, at a dose level of 0.25 to 1.0 J/Cm$^2$ using a D bulb (available from Fusion UV Systems, Inc. (Gaithersburg, Md.)) to produce an optical fiber having a diameter of about 245±10 µm. Each D-bulb was a 300 watt bulb. A person of ordinary skill in the art may also refer to the D-bulb as an irradiator lamp.

The percentage of cure was evaluated in accordance with the Fourier Transform Infrared Spectroscopy analyses. The percentage of cure of the primary coating for each coated fiber was evaluated under three different conditions. The first condition was a 3P/3S lamp configuration. Three irradiator lamps as described above were used to cure the primary coating and three irradiator lamps were used to cure the secondary coating. The second cure condition was a 2P/2S. Under this condition, two irradiator lamps were used to cure the primary coating and two irradiator lamps were used to cure the secondary coating. The last condition was 1P/1S. Under this last condition, one irradiator lamp is used to cure the primary coating and one irradiator lamp is used to cure the secondary coating.

The percentage of cure of fibers coated in accordance with the invention were found to be very high at all lamp configurations, compared to the percentage cure of the fiber with the control coating B (see Table 4). The percentage of cure of the coating A ranged from about 100% to about 88%. In comparison, the percentage of cure of the control was about 88% or less. The fast relative cure speed of the coating of the invention has been attributed to the combination of components in the coating of the invention including an oxyglycidyl acrylate.

TABLE 1

Primary Formulation Coating Made in Accordance with the invention (Coating A)

| Component | Trade Name | Description | Conc. |
|---|---|---|---|
| Oligomer | Bomar KWS1143 | Aliphatic urethane acrylate | 55% |
| Monomer | Sartomer CN130 | Aliphatic oxyglycidyl (meth)acrylate | 42% |
| Photoinitiator | Irgacure 1850 | bis acyl phosphine oxide blend | 3% |
| Adhesion Promoter | bis (tri methoxy Silylethyl) benzene | bis silane | 1 pph |
| Antioxidant | Irgacure 1035 | bis hindered Phenolic sulfide compound | 1 pph |

TABLE 2

Primary Formulation Control Coating (Coating B)

| Component | Trade Name | Company | Description | Conc. |
|---|---|---|---|---|
| Oligomer | BR3731 | Bomar | Urethane acrylate oligomer | 52% |
| Monomer | SR504 | Sartomer | Ethoxylated-nonylphenol acrylate | 45% |
| Photo-initiator | Irgacure 1850 | Ciba Specialty Chemicals | BAPO photoinitiator blend | 3% |
| Adhesion Promoter | silane | United Chemical Technologies | 3-mercaptopropyl-trimethoxy silane | 1 pph |
| Antioxidant | Irganox 1035 | Ciba Specialty Chemicals | Thiodiethylene bis(3,5-di-tert-butyl-4-hydroxy-hydrocinnamate) | 1 pph |

TABLE 3-1

Secondary Formulation Coating 1

| Component | Trade Name | Company | Description | Conc. |
|---|---|---|---|---|
| Oligomer | BR301 | Bomar | Urethane acrylate oligomer | 35% |
| Oligomer | BR3731 | Bomar | Urethane acrylate oligomer | 10% |
| Difunctional monomer | SR601 | Sartomer | Ethoxylated bisphenol A diacrylate | 10% |
| Trifunctional monomer | SR492 | Sartomer | Propoxylated trimethylolpropane triacrylate | 20% |

TABLE 3-1-continued

Secondary Formulation Coating 1

| Component | Trade Name | Company | Description | Conc. |
|---|---|---|---|---|
| Tetrafunctional monomer | SR494 | Sartomer | Ethoxylated pentaerythritol tetraacrylate | 22% |
| Photoinitiator | Irgacure 1850 | Ciba Specialty Chemicals | BAPO photoinitiator blend | 3% |

TABLE 3-2

Secondary Formulation Coating 2

| Component | Trade Name | Company | Description | Conc. |
|---|---|---|---|---|
| Oligomer | KWS1143 | Bomar | Urethane acrylate oligomer | 20% |
| Difunctional monomer | SR601 | Sartomer | Ethoxylated bisphenol A diacrylate | 20% |
| Trifunctional monomer | SR492 | Sartomer | Propoxylated trimethylol propane triacrylate | 32% |
| Tetra-functional monomer | SR355 | Sartomer | Di-trimethylolpropane tetraacrylate | 25% |
| Photo-initiator | Irgacure 1850 | Ciba Specialty Chemicals | BAPO photoinitiator blend | 3% |

TABLE 3-3

Secondary Formulation Coating 3

| Component | Trade Name | Company | Description | Conc. |
|---|---|---|---|---|
| Oligomer | CN934 | Sartomer | Urethane acrylate oligomer | 40% |
| Difunctional monomer | SR349 | Sartomer | Ethoxylated bisphenol A diacrylate | 20% |
| Trifunctional monomer | SR9020 | Sartomer | Propoxylated glycerol triacrylate | 20% |
| Tetra-functional monomer | SR355 | Sartomer | Di-trimethylolpropane tetraacrylate | 17% |
| Photo-initiator | Irgacure 1850 | Ciba Specialty Chemicals | BAPO photoinitiator blend | 3% |

TABLE 3-4

Secondary Formulation Coating 4

| Component | Trade Name | Company | Description | Conc. |
|---|---|---|---|---|
| Oligomer | BR441 | Bomar | Urethane acrylate oligomer | 50% |
| Difunctional monomer | SR602 | Sartomer | Ethoxylated bisphenol A diacrylate | 26% |
| Difunctional monomer | SR344 | Sartomer | Polyethylene glycol (400) diacrylate | 8% |
| Tetra-functional monomer | SR295 | Sartomer | Pentaerythritol tetraacrylate | 12% |
| Photo-initiator | Irgacure 1850 | Ciba Specialty Chemicals | BAPO photoinitiator blend | 3% |
| Photo-initiator | Irgacure 651 | Ciba Specialty Chemicals | Benzil dimethyl ketal | 1% |

TABLE 3-4-continued

Secondary Formulation Coating 4

| Component | Trade Name | Company | Description | Conc. |
|---|---|---|---|---|
| Antioxidant | Irganox 1035 | Ciba Specialty Chemicals | Hindered phenol | 0.5 pph |

TABLE 4

Percentage of Cure of Primary Coating of Coated Optical Fiber

| Coating Formulation Primary-Secondary | 3P/3S | 2P/2S | 1P/1S |
|---|---|---|---|
| A-1 | 100% | 99% | 88% |
| A-2 | 99% | 94% | 92% |
| A-3 | 97% | 98% | 97% |
| B-4 | 88% | 83% | 69% |

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A coating for an optical fiber comprising:
   an aliphatic oxyglycidyl (meth)acrylate monomeric component; and
   an ethylenically unsaturated urethane or urea oligomeric component.

2. The coating of claim 1 further comprising a photoinitiator.

3. The coating of claim 2 further comprising an antioxidant.

4. The coating of claim 1 wherein said monomeric component has the structure

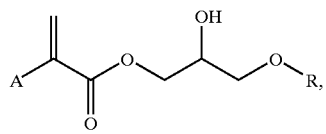

wherein R comprises an aliphatic moiety and wherein A comprises H or CH$_3$.

5. The coating of claim 4 wherein said R is a 10–13 carbon aliphatic hydrocarbon.

6. The coating of claim 1 further comprising a co-monomer.

7. The coating of claim 1 wherein said coating includes about 5 to about 95 weight percent of said monomeric component.

8. The coating of claim 7 wherein said weight percent of monomeric component is about 5 to about 60 percent by weight.

9. The coating of claim 8 wherein said weight percent of said monomeric component is about 20 to about 50 percent by weight.

10. The coating of claim 6 wherein said coating includes at least about 5 weight percent of said monomeric component.

11. The coating of claim 6 wherein said coating includes about 10 to 50 weight percent of said monomeric component and up to about 30 weight percent of said co-monomer.

12. The coating of claim 1 further comprising an adhesion promoter.

13. The coating of claim 12 wherein said adhesion promoter is one selected from the group consisting of an organofunctional silane, a titanate, a zirconate, or mixtures thereof.

14. The coating of claim 12 further comprising a carrier additive.

15. The coating of claim 1 wherein said oligomeric component is an aliphatic polyether urethane acrylate.

16. The coating of claim 1 wherein said monomeric component is an aliphatic oxyglycidyl (meth)acrylate.

17. The coating of claim 2 wherein said photoinitiator includes a bis acyl phosphine oxide.

18. The coating of claim 1 wherein the coating exhibits a cure percentage of at least 88 percent when cured by exposure to actinic radiation.

19. The coating of claim 17 wherein said actinic radiation is ultraviolet light.

20. An optical fiber comprising:
a glass fiber; and
a primary coating encapsulating and in contact with said glass fiber, said primary coating being the cured product of a polymerizable composition comprising a monomer with an aliphatic oxyglycidyl (meth)acrylate component and is present in an amount effective to increase polymerization rate.

21. The optical fiber of claim 20 wherein said monomeric component has the structure

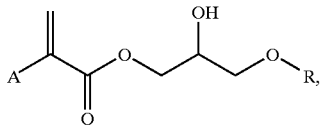

wherein R comprises an aliphatic moiety and wherein A comprises H or $CH_3$.

22. The optical fiber of claim 21 wherein said R is a 10–13 carbon aliphatic hydrocarbon.

23. An optical fiber according to claim 20, wherein said polymerizable composition further comprises an oligomer capable of being polymerized and a co-monomer.

24. The optical fiber of claim 23 wherein said oligomer is ethylenically unsaturated urethane or urea and present in said polymerizable composition in an amount of about 10 to 90 percent by weight.

25. The optical fiber according to claim 20 further comprising at least one secondary coating.

26. An optical fiber ribbon comprising a plurality of optical fibers according to claim 20 and a matrix material encapsulating said plurality of optical fibers.

27. A method of making an optical fiber comprising:
coating a glass fiber with a primary polymerizable composition comprising a monomer with an aliphatic oxyglycidyl (meth)acrylate component present in an amount effective to increase polymerization rate; and
polymerizing the composition.

28. The method according to claim 27 further comprising coating the glass fiber with a secondary polymerizable composition over the primary polymerizable composition or the primary coating.

29. A method according to claim 28 wherein said coating the glass fiber with a secondary polymerizable composition is carried out prior to said polymerizing, whereby said polymerizing simultaneously polymerizes the primary polymerizable composition and the secondary polymerizable composition.

30. A method according to claim 28 wherein said coating the glass fiber with a secondary polymerizable composition is carried out after said polymerizing, said method further comprising polymerizing the secondary polymerizable composition after it is applied to the glass fiber.

* * * * *